*Celius E. Richards, Improved Swivel Hook.*

116870

PATENTED JUL 11 1871

Witnesses.
S. Scholfield
Wm. H. Robinson

Celius E. Richards

UNITED STATES PATENT OFFICE.

CELIUS E. RICHARDS, OF NORTH ATTLEBOROUGH, MASSACHUSETTS, ASSIGNOR TO HIMSELF, WILLIAM. H. ROBINSON, AND DANIEL H. ROBINSON, OF SAME PLACE.

IMPROVEMENT IN SWIVEL-HOOKS.

Specification forming part of Letters Patent No. 116,870, dated July 11, 1871.

*To all whom it may concern:*

Be it known that I, CELIUS E. RICHARDS, of North Attleborough, Bristol county, State of Massachusetts, have invented an Improved Swivel-Hook for Watch-Chains, of which the following is a specification:

The nature of my invention consists in the combination of a rigid hook with a hollow cap, operating to cover the hook by means of a male and female screw.

Figure 1:
Figure 2:
Figure 3:
Figure 4:
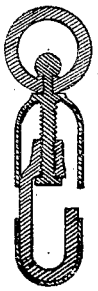

Figure 1 represents a side view of the ordinary swivel-hook used for watch-chains. Fig. 2 represents a side view of a modification of my improvement. Fig. 3 represents a side view of another modification. Fig. 4 represents a sectional side view of Fig. 3.

In the manufacture of the ordinary swivel-hook shown in Fig. 1 it is difficult to form the joint *a* and to give the swivel a finish to compare favorably with that of the chain, especially if elaborate workmanship is required. The forming and finishing of the joint, being also somewhat expensive, render it highly desirable that a more suitable device should be adopted. In order to supply this want of the trade I have, instead of making the hook A with a hinge-joint, *a*, as heretofore, made it rigid, as shown in Fig. 2, placing a hollow cap, B, upon the shank of the hook, operating, by means of a male and female screw, to raise the cap above or to close it down upon the hook. The ring C, used to connect the chain to the hook, is made as heretofore. An improved arrangement of this hollow cap and rigid hook is shown in Fig. 3, where the female screw is cut upon the shank of the hook instead of in the top of the cap, as in Fig. 2. This latter arrangement is also preferable to that of Fig. 2 on account of its neater appearance, the thread of the screw being entirely concealed by the cap, thus securing a surface which may be made to compare favorably with a chain of elaborate workmanship.

I claim as my invention—

The combination of a rigid hook, A, hollow cap B, and ring C, substantially as described.

CELIUS E. RICHARDS.

Witnesses:
S. SCHOLFIELD,
WM. H. ROBINSON.